United States Patent [19]

Kozinski

[11] Patent Number: 5,388,864
[45] Date of Patent: Feb. 14, 1995

[54] AIR BRAKE HOSE COUPLING MEMBER

[76] Inventor: Richard R. Kozinski, 2205 Dunkeith Dr., NW., Canton, Ohio 44708

[21] Appl. No.: 199,477

[22] Filed: Feb. 22, 1994

[51] Int. Cl.⁶ .......................... F16L 35/00; B60D 1/08
[52] U.S. Cl. ........................................ 285/78; 285/69; 285/76; 285/82
[58] Field of Search ............................ 285/69, 76-79, 285/81, 82, 87

[56] References Cited

U.S. PATENT DOCUMENTS

| | | | |
|---|---|---|---|
| Re. 12,902 | 12/1908 | Kilpatrick | 285/69 |
| 481,250 | 8/1892 | Barnes . | |
| 509,114 | 11/1893 | Beery . | |
| 558,174 | 4/1896 | Herder | 285/69 |
| 938,183 | 10/1909 | Towne | 285/79 |
| 963,137 | 7/1910 | Gold | 285/76 |
| 972,829 | 10/1910 | Creveling | 285/76 |
| 1,003,598 | 9/1911 | Graves | 285/69 |
| 1,021,982 | 4/1912 | Gold | 285/76 |
| 1,159,927 | 11/1915 | Gold et al. | 285/77 |
| 1,245,332 | 11/1917 | Gold | 285/77 |
| 1,249,074 | 12/1917 | Haldeman | 285/69 |
| 1,395,273 | 11/1971 | Gold | 285/76 |
| 3,010,167 | 11/1961 | Kozinski | 22/200 |
| 3,879,066 | 4/1975 | Kozinski | 285/69 |
| 3,892,431 | 7/1975 | Booth | 285/79 |

FOREIGN PATENT DOCUMENTS

| | | | |
|---|---|---|---|
| 579335 | 7/1959 | Canada | 285/69 |
| 388777 | 1/1924 | Germany | 285/69 |
| 20192 | 5/1915 | Netherlands | 285/69 |

*Primary Examiner*—Eric K. Nicholson
*Attorney, Agent, or Firm*—Michael Sand Co.

[57] ABSTRACT

A coupling member for detachably connecting together two sections of air brake hose between railroad cars. Each coupling member has a hollow tubular body with one end attached to a section of hose and with an opposite end having an arcuate body portion extending circumferentially about and outwardly of the tubular body, and has an arcuate locking lug extending generally axially from the body concentric with the arcuate body portion. An L-shaped arcuate flange projects outwardly and forwardly from a rear portion of the tubular body and is provided with a lip which engages a similar lip formed on the arcuate locking lug of the other of two coupling members to secure the members in coupled position. An elastomeric gasket is mounted within the bore of the tubular body and forms an airtight seal with a similar gasket mounted on the other coupling member. A finger is pivotally mounted within a radially extending slot formed in an arcuate end body portion of the tubular body. The finger has a bent outer end which traps a corner of the L-shaped arcuate flange of an opposite coupling member upon the two members being rotated toward the uncoupled position but prior to reaching this position. The locking finger is provided with a positive retention mechanism for retaining the finger in the unlocked position to avoid interference with the coupling members when the members are joined and rotated to the joined position. The bent end of the locking finger provides a positive mechanical lock to prevent premature rotational uncoupling of the joined members.

11 Claims, 3 Drawing Sheets

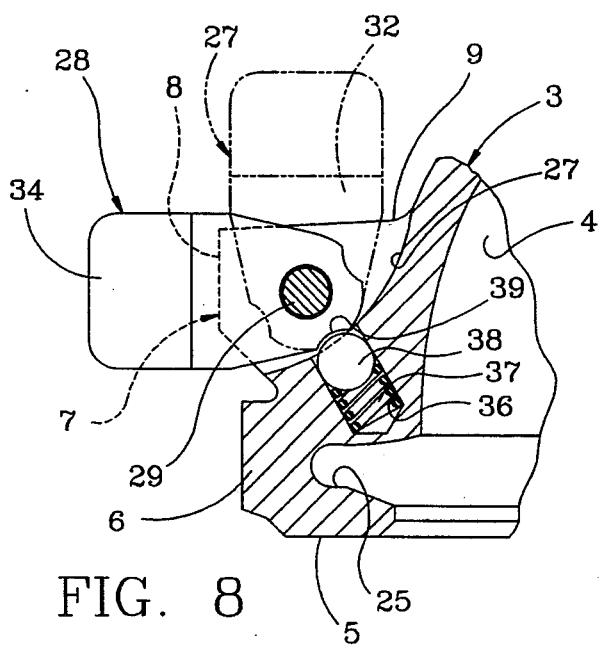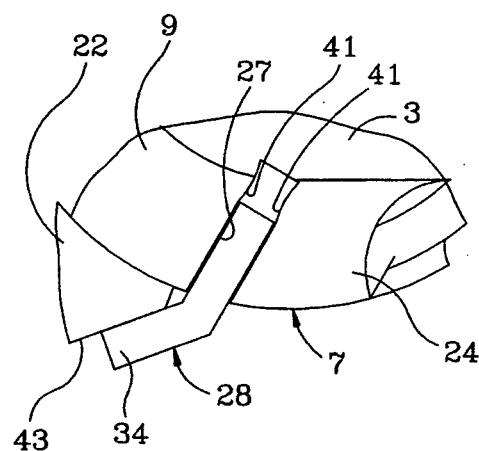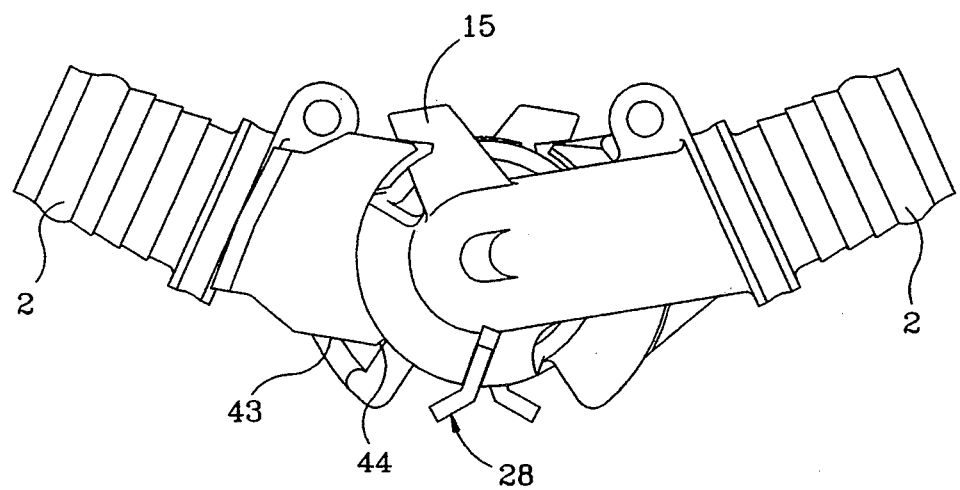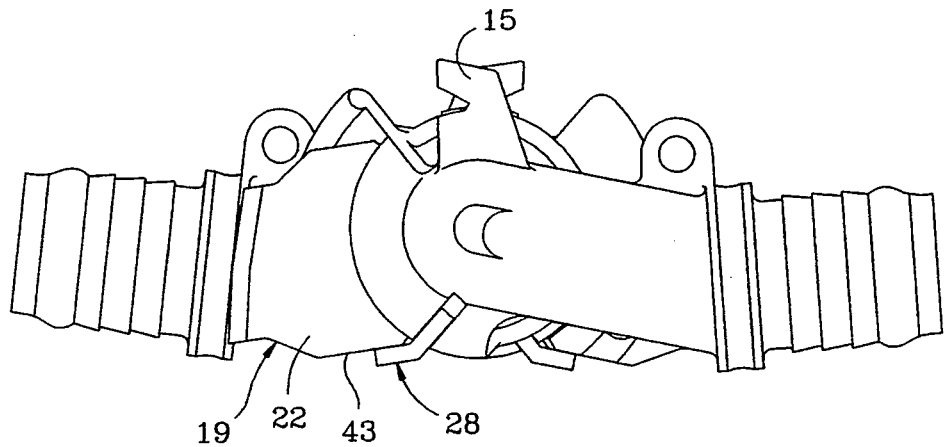

AIR BRAKE HOSE COUPLING MEMBER

BACKGROUND OF THE INVENTION

1. Technical Field

The invention relates to a coupling of two similar coupling members for detachably connecting the ends of air brake hoses for trucks or railroad cars to form an airtight connection. More particularly, the invention relates to an improved air brake hose coupling member having locking means preventing accidental rotational separation of a joined coupling.

2. Background Information

Railroad cars and certain types of trucks having pneumatic brake systems use flexible air hoses which extend between separate railroad cars or portions of a tractor-trailer assembly for operation of the pneumatic brake system. A coupling member is attached to each end of the flexible hoses for detachably connecting the hose sections together when individual railroad cars are joined to form a unit train. These couplings are designed and manufactured to meet the requirements of the Association of American Railroads or the Society of Automotive Engineers and are generally similar, so as to be compatible and interchangeable with those of other manufacturers.

These couplings are located between coupled railroad cars for joining together sections of air hose which extend from the braking system of each car. When coupled, the air pressure in the hose lines maintains the brakes of the individual cars in an "off" position. Thus, accidental separation of the coupling between two sections of air hose will apply the emergency car brakes, resulting in sudden stopping of a train with the subsequent delay, inconvenience and expense and chance of accidents.

The couplings on many types of railroad cars are suspended between the cars and hang a short distance above the ground or railroad tracks, four inches minimum, especially when the connecting hoses become worn and have less rigidity, permitting greater sag in the coupling. These couplings are joined together by a rotational downward motion which interengages mating flanges and lugs extending from the coupling members. Occasionally these members become uncoupled prematurely when struck by a raised object or the like lying between the railroad tracks which moves the coupled members upwardly, thus rotating the members in the uncoupling direction. This results in the undesirable emergency stopping of the train.

Several types of locking devices have been devised for known coupling members to prevent such premature uncoupling, such as shown in U.S. Pat. Nos. 3,892,431 and 3,879,066. Although these types of locking devices do reduce the accidental uncoupling of the coupling members, they still will permit premature rotational separation if a sufficient rotational torque is applied thereto, especially when the sealing gaskets become old and worn. Both of these known types of locking devices rely upon the outward pressure exerted on the two coupling members by the compressed gaskets located therebetween to assist in maintaining the members coupled together.

Thus, a need has existed for an improved air brake hose coupling member which enables rapid connection of hose sections in the heretofore usual manner without additional manipulations being required, which does not affect the usual axial separation and operation of such coupling members, and which prevents or considerably reduces premature uncoupling of the attached members.

SUMMARY OF THE INVENTION

Objectives of the invention include providing an improved air brake hose coupling member which meets the requirements of the Association of American Railroads or Society of Automotive Engineers and which is compatible or inter-changeable with existing coupling members being used.

It is a further object of the invention to provide an improved air brake hose coupling member having a locking finger which prevents the premature rotational uncoupling of the joined coupling members when struck by a raised object in the railroad bed or the like, or when experiencing large vibrational forces.

A still further objective is to provide such an improved air brake hose coupling member having a locking finger which does not interfere with the usual rotational coupling procedure, and which has a positive retaining means to maintain the finger out of the path of the rotational members when rotated into the locked position.

Another objective of the invention is to provide such a coupling member in which the locking finger is unaffected by minor manufacturing tolerances and variations of the coupling-engaging flanges, and which can be produced relatively inexpensively with a minimum amount of precision machining being required, and which enables the coupling member to maintain the usual airtight connection and other advantages with existing coupling members, and which provides its locking effect completely independent of the lateral forces applied to the coupling members by the compressed gaskets.

A further objective is to provide such a coupling member which eliminates difficulties encountered with prior coupling members having locking means thereon, and which achieves the stated objectives in a simple, effective and efficient manner.

These objectives and advantages are obtained by the improved air brake hose coupling member of the present invention, the general nature of which may be stated as including a generally tubular body with a neck at one end adapted to be connected to an air hose, and with arcuate locking lug means projecting outwardly from the other end of the body; the tubular body having an outer curved end portion spaced inwardly of and generally concentrically curved with respect to said arcuate locking lug means, and having L-shaped flange means formed on the body means, said locking lug means and L-shaped flange means adapted to engage L-shaped flange means and locking lug means, respectively, of another coupling member similar to said coupling member, to couple said members together when the members are placed in abutting relationship and rotated oppositely with respect to each other; the improvement including a radially extending slot formed in the curved end portion of the tubular body, a rigid finger having an angled end and an opposite pivot end; pin means for pivotally mounting the finger on the body within the slot for movement of the angled end in a generally radial direction with respect to the tubular body between locked and unlocked positions; and said bent end being adapted to extend generally along an outer edge of the L-shaped flange means of a coupled coupling member to trap a corner of said L-shaped flange means between said angled end and the curved end portion of the tubular body.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

FIG. 4 is a view similar to FIGS. 2 and 3 combined showing a pair of the improved coupling members in their engaged locked position;

FIG. 5 is a view similar to FIG. 4 showing the upward rotational movement of the pair of coupling members toward the unlocked position;

FIG. 8 is an enlarged fragmentary view with portions broken away and in section, showing the locking finger in full line in locked position and in dot-dash lines in unlocked position; and FIG. 8A is an enlarged fragmentary plan view showing another type of retention means for retaining the locking finger in the unlocked position.

Similar numerals refer to similar parts throughout the drawings.

DESCRIPTION OF THE PREFERRED EMBODIMENT

Figure 1:
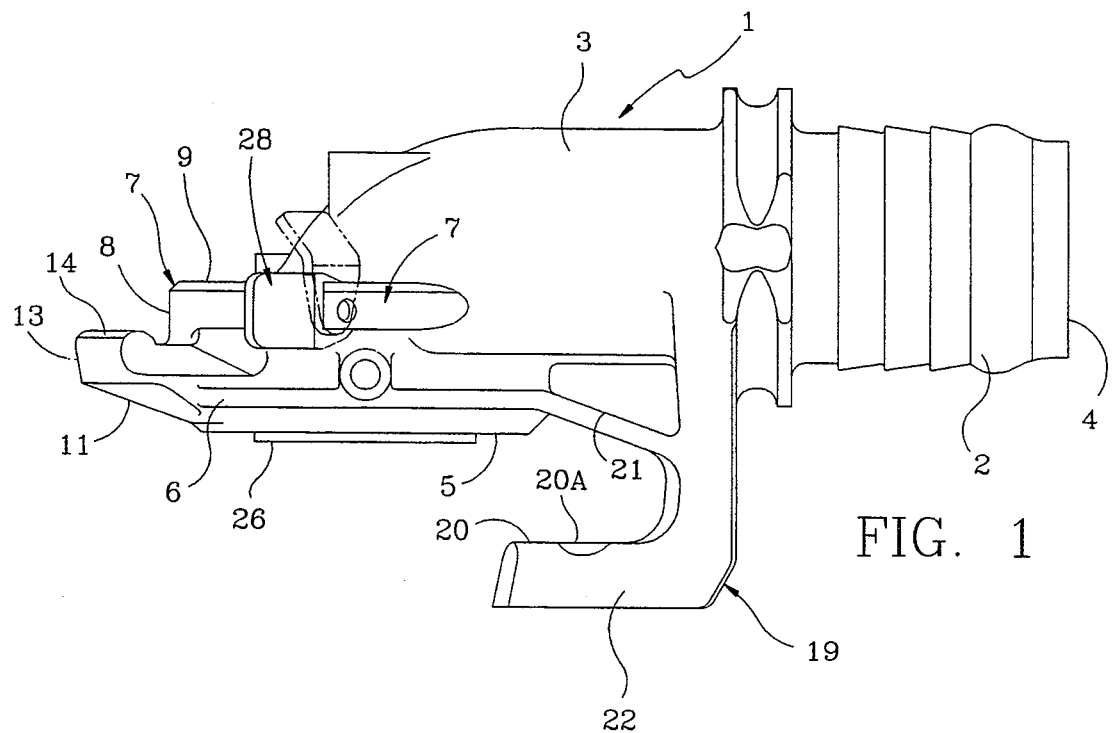
FIG. 1 is a side elevational view of the improved coupling member with the locking finger shown in locking position in full lines and in an unlocked position in dot-dash lines.
Figure 2:
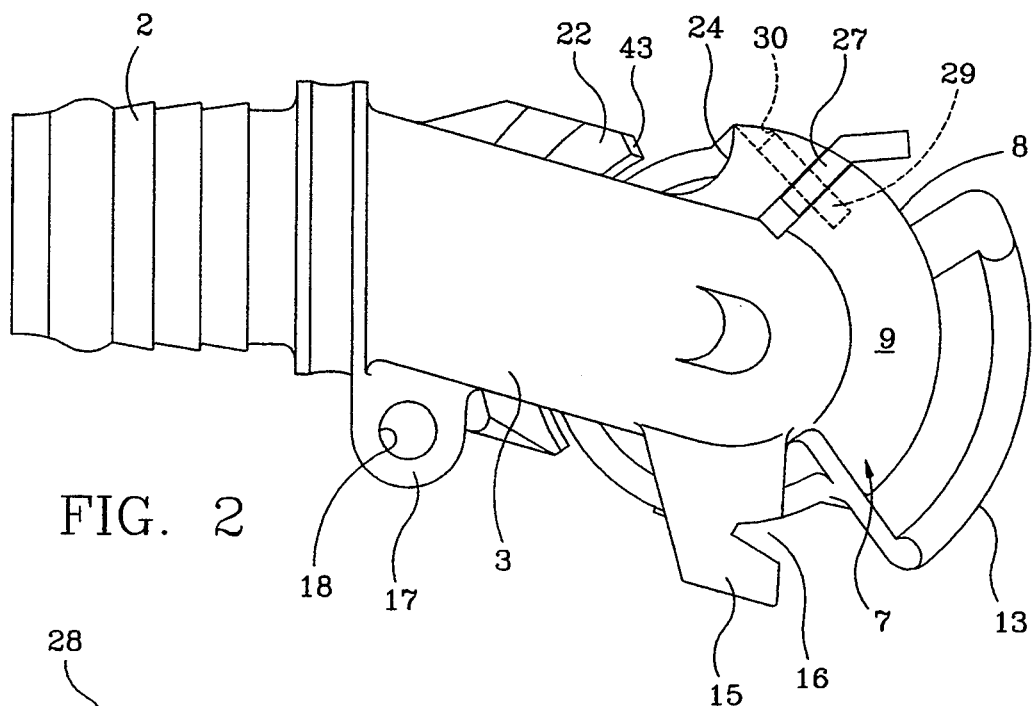
FIG. 2 is a top plan view of the coupling member shown in FIG. 1, with the locking finger shown in locked position.
Figure 3:
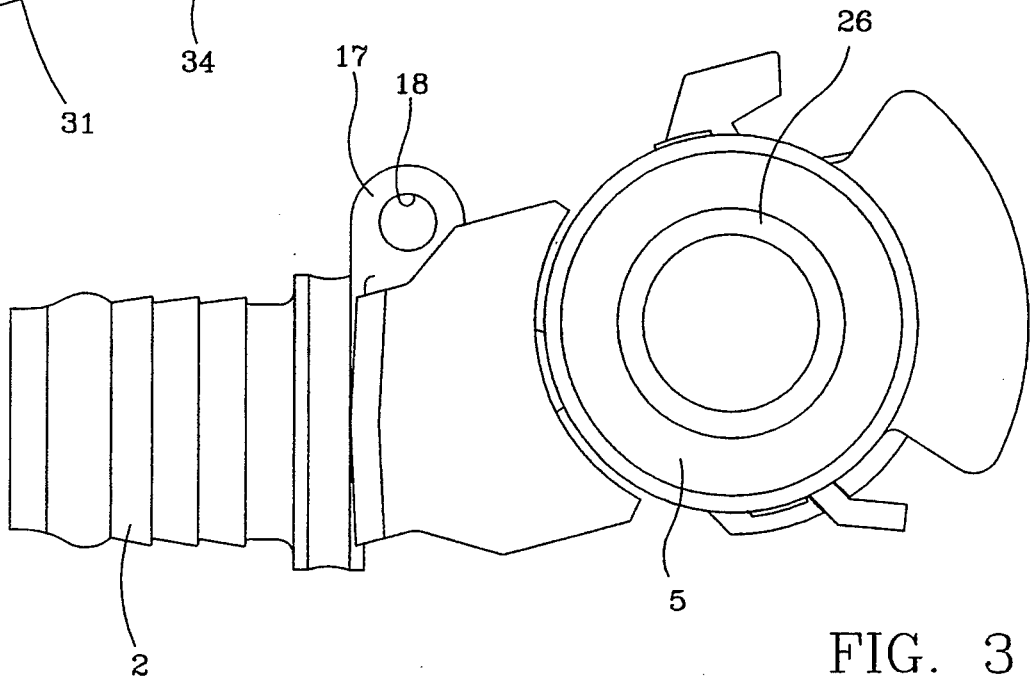
FIG. 3 is a bottom plan view of the coupling member of FIGS. 1 and 2, with the locking finger shown in locked position.

The improved air brake hose coupling member of the present invention is indicated generally at 1, and is best shown in FIGS. 1, 2 and 3. Two coupling members 1 are shown in FIGS. 4 and 5 in their usual coupled position. Coupling member 1 is similar in most respects to the coupling member shown in U.S. Pat. No. 3,879,066, the contents of which are incorporated herein by reference, except it has the improved locking feature described below, which replaces the locking finger of this prior art coupling member.

Coupling member 1 has a tubular neck 2 which is connected to a usual flexible hose (not shown) of a railroad car braking system, and is preferably connected at an angle of approximately 15° with a tubular body 3, as shown in FIGS. 2 and 3. Tubular body 3 has a bore 4 which terminates at an inner coupling face 5 (FIG. 3) which is generally flat and has an annular configuration and is located on a generally circular body portion 6 of body 3. The plane of coupling face 5 is generally parallel with the axis of the bore extending through body 3 and neck 2, as can be seen in FIG. 1.

The front portion of tubular body 3 terminates in an arcuate flanged body portion 7 which has a curved front surface 8 and a curved flat top surface 9. An arcuate flange, generally indicated at 11, projects outwardly from body 3 and extends in a generally circular fashion generally concentric with and spaced below arcuate front surface 8. Flange 11 includes an arcuate-shaped end locking lug 13 which projects outwardly from body 3 and terminates in a raised rounded lip 14. Lip 14 projects outwardly from lug 13 in a direction away from coupling face 5, as shown in FIG. 1.

A stop member 15 is formed on body 3 and projects outwardly from the top portion thereof, and is formed with a generally V-shaped notch 16 which circumferentially aligns with flange end surface 8. Stop 15 and notch 16 limit the rotational movement of a pair of coupling members 1 with respect to each other when rotated in the coupling direction, as shown particularly in FIG. 4. A boss 17 is formed on body 3 adjacent neck 2 and has an opening 18 to permit a chain, strap or other supporting device to be connected to coupling member 1 to positively support joined members 1 between a pair of railroad cars and at least four inches above the track.

An L-shaped annular flange, indicated generally at 19 (FIG. 1), extends laterally outwardly from body 3 and has a leg 22 which extends forwardly in a generally parallel relationship with body 3. Flange 19 cooperates with locking lug 13 of the mating coupling member, and vice versa, to couple a pair of members 1 together. Flange 19 includes an arcuate lip 20 which projects toward coupling face 5 and interlocks with lip 14 of flange 11 of a corresponding coupling member 1 when the two coupling members are rotatably connected together. When coupled together, lip 14 seats in an arcuate groove 20A formed adjacent lip 20 and concentric therewith. Flange 19 also is formed with various reinforcing ribs 21 to provide the desired strength for the coupling member.

An annular recess 25 (FIG. 8) is formed in body 3 about bore 4 adjacent coupling face 5, for receiving a sealing gasket 26 therein (FIG. 3). Gasket 26, when seated in recess 25, extends outwardly beyond face 5, as shown in FIG. 1, and engages and aligns with a corresponding gasket of a second coupling member 1 when the two members are joined together. Gaskets 26 are held under compression when the two coupling members 1 are joined and form an air passageway between the coupling members.

In accordance with the invention, a generally radially extending slot 27 is formed in body flange 7 (FIGS. 2 and 6) spaced circumferentially inwardly from and generally adjacent to the inner end 24 of flange body portion 7. A locking finger, indicated generally at 28 (FIG. 7), is pivotally mounted within slot 27 by a pin 29. Pin 29 is inserted within a hole 30 drilled into flange body portion 7, which hole extends angularly inwardly from inner end 24. Pin 29 extends through a complementary-shaped hole 31 formed in the inner end 32 of finger 28. Finger 28 includes an outer bent end section 34, which in the preferred embodiment, forms an included angle of approximately 45° with inner finger end 32. In the preferred embodiment, locking finger 28 will be stainless steel and have a thickness of approximately 0.172 inches, with bent end portion 34 having a length of approximately 154 inch.

Hose sections (not shown) which connect to neck 2 extend outwardly from the ends of adjacent railroad cars, and are connected to the appropriate air lines and associated brake equipment mounted on the cars. A coupling member 1 is attached to the end of each of the hoses and is located generally under the mechanical coupler mechanism of the railroad car so that a trainman can easily grasp members 1 which are supported by a separate chain or other device connected to boss 17 to provide support.

In a usual air brake hose coupling procedure, a trainman will grasp a pair of adjacent coupling members 1, one in each hand, and bend the hose ends upwardly so that members 1 are in an adjacent position, generally beyond the position of FIG. 5. The coupling faces 5 are then moved together, bringing gaskets 26 into an abutting compressed relationship with respect to each other. Prior to this, locking finger 28 is moved to the unlocked position, as shown by dot-dash lines in FIG. 1 and in FIG. 8.

Preferably, a mechanism is provided for positively retaining finger 28 in the unlocked position to facilitate the rotational joinder of the two coupling members without the trainman having to be concerned with the fingers interfering with the rotational coupling movement of the two members. One form of finger retention means is shown in FIG. 8 and includes the forming of a slot 36 in the circular body portion 6 of body 3, which contains a compression coil spring 37 and a ball detent 38. Ball detent 38 seats in a small notch 39 formed in the end of finger 28 to retain the finger in the unlocked position.

Another means of retaining the finger in the unlocked position is to distort the metal adjacent the end of slot 27 (FIG. 8A) to provide a pair of opposed material projections 41 which frictionally engage inner end 32 of finger 28 when it is pivoted to the unlocked position to frictionally hold the finger in this position.

After placing gaskets 26 in the compressed abutting relationship, members 1 are rotated downwardly in opposite directions with respect to each other by the trainman until they assume the coupled engaged position of FIG. 4. Lips 14 and 20 of flanges 11 and 19 are interlocked with each other in a usual manner, and are held in engaged position by the force exerted by the mated compressed sealing gaskets 26. Gaskets 26 and lips 14 and 20 resist the axial separation of coupled members 1 when in the coupled position, when the members experience small forces applied axially on the hose sections. However, when a large axial force is applied, as during uncoupling of adjacent cars, the two members will axially separate. The coupled members 1 assume the locked or coupled position of FIG. 4, suspended between adjacent railroad cars, during normal use.

In further accordance with the invention, fingers 28 are manually pivoted downwardly by the trainman to their locked position, overcoming either the biasing force of spring 37 or the frictional engagement of material projections 41, after the members are rotated to their coupled locked position of FIG. 4. In the one embodiment of FIG. 8, the fingers will remain in this downwardly extending position by ball detent 38 being engaged in a second notch 39 in finger end 32, or in the second embodiment by material projections 41 preventing return of the fingers to the unlocked position. The fingers are furthermore retained in their downward locked position by the force of gravity acting thereon.

Coupled members 1 are prevented from continued rotation in the locking direction after proper engagement of flanges 11 and 19 by locking edges 44 of flange leg 22 engaging stop member 15 within V-shaped notches 16. Joined coupling member 1 remain in the position of FIG. 4 until rotationally uncoupled by a trainman, or most often by a sufficiently large force exerted in an axial direction to overcome the compressive force exerted by gaskets 26. It is the usual practice in uncoupling air brake hoses of railroad cars to first uncouple the mechanical coupler mechanism, and then by moving one of the cars away from the other, a sufficiently large axial force is exerted on the joined members to overcome the compressive force of gaskets 26, whereupon the members separate or pull apart in an axial direction. The generally rounded formation of interlocked lips 14 with lips 20 and the spacing between coupling faces 5 provided by abutting gaskets 26, permit faces 5 to move toward each other compressing gaskets 26, enabling lips 14 and 20 to become disengaged from each other. Locking fingers 28 do not prevent or hinder in any way such usual axial uncoupling procedure.

Figure 6:
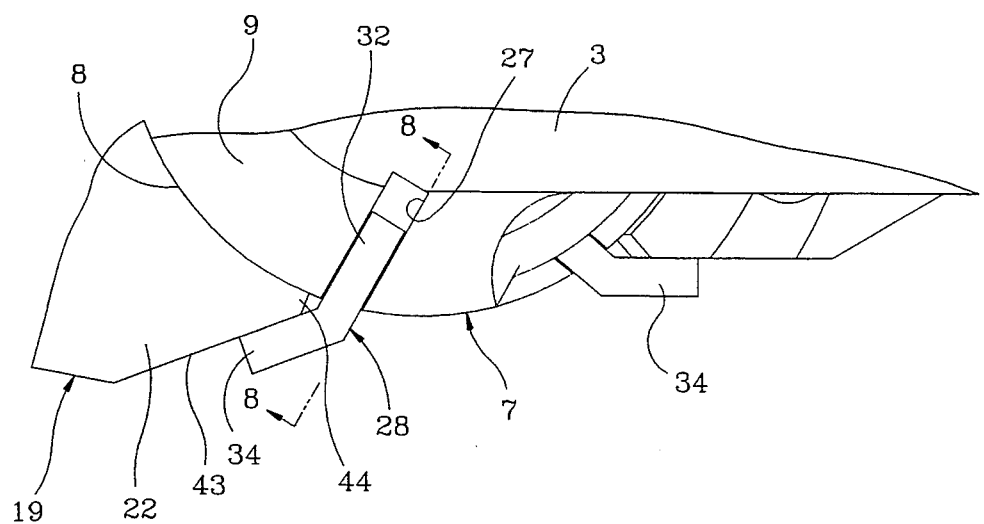
FIG. 6 is an enlarged fragmentary view of the lower portion of FIG. 5, showing the locking fingers of the two coupled members preventing rotational uncoupling of the joined members.
Figure 7:
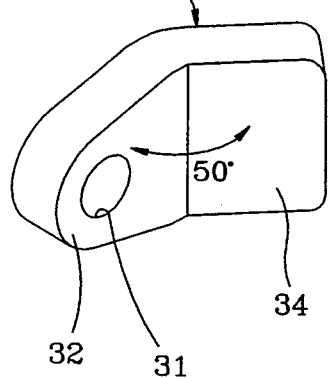
FIG. 7 is an enlarged perspective view of the locking finger of the improved coupling member.

Fingers 28, however, do prevent premature uncoupling of a pair of members 1 by accidental upward rotational movement of the coupling members from the position of FIG. 4 toward that of FIG. 5. When the coupled members are struck by raised objects in the railroad track bed, such as snow, ice, etc., or due to the hoses becoming excessively flexible and having a bouncing action imparted thereon due to the motion of the train, this premature undesirable unlocking rotational motion can occur. However, before the two members are rotated upwardly a sufficient rotational distance to reach their unlocked position, bent ends 34 of fingers 28 engage straight edge 43 of outwardly extending leg 22 of L-shaped flange 19, trapping corner 44 of flange 19 within the included angle formed by bent end section 34 of finger 28 and inner finger end 32, and between the outer curved surface 8 of arcuate flanged end portion 7, as shown in FIGS. 6, 8 and 8A.

Tests have shown that without the trapping of corner 44 of flange leg 22 by bent end 34, a sufficiently large rotational force will cause straight edge 43 to pivot on the stop member or finger, such as could occur with the straight locking members of U.S. Pat. Nos. 3,892,431 and 3,879,066, permitting the rotational separation of the coupled members. Tests have shown that the torque necessary to rotationally separate two joined coupling members of the type described above and shown in the drawings, as well as in U.S. Pat. No. 3,879,066, which does not have a locking finger of the present invention and without any gasket 26 is nearly zero foot pounds since nothing keeps the two members from rotationally separating. These same tests have shown that the torque necessary to separate such coupling members having new gaskets but without any locking fingers, is slightly above two foot pounds. These same tests have shown that with couplers with locking fingers as shown in U.S. Pat. No. 3,879,066 with new gaskets, require a rotational torque of approximately sixteen foot pounds to affect rotational separation.

Tests performed on improved coupler 1 of the present invention using the bent end finger 28, generally resulted in the finger bending at approximately 375 foot pounds without the coupling members rotationally disengaging. The same results are obtained on improved coupling member 1 even without any gaskets being used in the couplers. Thus, the improved coupler increases dramatically the rotational force required to accidentally, prematurely separate the two joined members, irrespective of the resiliency provided by the mated gaskets, unaffected by the age of the gaskets which is a factor in prior couplers. The limiting factor in improved coupler 1 is the fatigue strength of the metal of the locking finger, or the strength of the metal of tubular body 3 and/or arcuate flanged body portion 7, which is considerable.

The improved air brake hose coupling member of the present invention thus provides a new locking device which prevents the premature rotational uncoupling of the coupled members by providing a pivotally mounted finger having a bent end which engages and traps the end of the flange leg of the adjacent coupler member. Furthermore, the locking finger can be easily positively retained in its unlocked position, preventing it from being in the way of the coupling members when rotated into the locked position, and thereafter is moved easily by the trainman into the locked position where it is retained by gravity or a positive retention force to prevent it from accidentally being moved to the unlocked position.

Furthermore, the improved coupler member 1 does not rely on the strength of the compressive force or resiliency of the two joined sealing gaskets, and provides a coupling member in which the locking finger can be incorporated easily into the existing types and styles of coupling members at relatively little expense, and does not require critical machining and extremely close tolerances. The positive mechanical locking finger provides a coupling member which is effective, safe, inexpensive, efficient in assembly, operation and use, and which achieves all the 15 enumerated objectives, provides for eliminating difficulties encountered with prior couplers, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved coupler is constructed and used, the characteristics of the construction, and the advantageous, new and useful results obtained; the new and useful structures, devices, elements, arrangements, parts and combinations, are set forth in the appended claims.

I claim:

1. An improved air brake hose coupling member having a generally tubular body with a neck at one end adapted to be connected to an air hose, and with arcuate locking lug means projecting outwardly from the other end of the body; the tubular body having an outer curved end portion spaced inwardly of and generally concentrically curved with respect to said arcuate locking lug means, and having L-shaped flange means formed on the body, said locking lug means and L-shaped flange means adapted to engage L-shaped flange means and locking lug means, respectively, of another coupling member similar to said coupling member, to couple said members together when the members are placed in abutting relationship and rotated oppositely with respect to each other; the improvement including a radially extending slot formed in the curved end portion of the tubular body; a rigid finger having an angled end and an opposite pivot end; pin means for pivotally mounting the finger on the body within the slot for movement of the angled end in a generally radial direction with respect to the tubular body between locked and unlocked positions; said angled end being adapted to extend generally along an outer edge of the L-shaped flange means of a coupled coupling member to trap a corner of said L-shaped flange means between said angled end and the curved end portion of the tubular body; and retention means for retaining the finger in the unlocked position.

2. The hose coupling member defined in claim 1 in which the retention means is a spring-biased ball detent.

3. The hose coupling member defined in claim 1 in which the retention means is a protrusion of material of the curved end portion of the tubular body extending into the slot for frictional engagement with the pivot end of the finger.

4. The hose coupling member defined in claim 1 in which the pivot end and angled end of the finger are both planar straight sections; and in which the angled end forms an included angle of approximately 45° with the pivot end.

5. The hose coupling member defined in claim 1 in which the body includes a coupling face; in which the body is formed with a bore which terminates at the coupling face; in which a gasket is mounted on the body adjacent the coupling face and surrounds the bore; and in which the gasket projects outwardly beyond said coupling face.

6. An interlocking hose coupling having at least first and second rotatably engaging bodies which couple respectively associated hoses, said coupling being disengageable when sufficient separating forces are exerted axially along said hoses, said coupling comprising a first stop means disposed on said first body arranged to contact said second body and to thereby impede rotation of said second body with respect to said first body when said second body is rotated in a first direction so that said bodies do not become inadvertently separated by rotational movement in said first direction; and a second releasable stop means permanently secured to at least one of said bodies and movable to a position for contacting the other body and thereby impeding rotation of said second body with respect to said first body when said second body is rotated in a second direction so that said bodies do not become inadvertently separated by rotational movement in said second direction; wherein said first and second stop means limit rotational movement in said first and second directions to a predetermined rotational arc when said bodies are rotatably engaged, and said second releasable stop means controllably permits the rotational disengagement of said second body from said first body when actuated, with neither of said first and second stop means impeding separation of said first and second bodies by separating forces exerted axially along said hoses; and wherein said second stop means includes a finger pivotally mounted on said one body having a bent end which traps a portion of the other of said bodies therein upon rotation of said bodies in the second direction; and retention means for retaining the finger in the unlocked position.

7. The coupling defined in claim 6 including a slot formed in the one said body and a pin pivotally mounting an end of the finger opposite of the bent end, in said slot.

8. The coupling defined in claim 6 in which the slot extends in a radial direction in said one body with respect to the first and second rotational direction.

9. The coupling defined in claim 6 in which the retention means is a spring-biased ball detent.

10. The coupling defined in claim 6 in which the retention means is a protrusion of material of the tubular body extending into the slot for frictional engagement with a pivot end of the finger.

11. An improved air brake hose coupling member having a generally tubular body with a neck at one end adapted to be connected to an air hose, and with arcuate locking lug means projecting outwardly from the other end of the body; the tubular body having an outer curved end portion spaced inwardly of and generally concentrically curved with respect to said arcuate locking lug means, and having L-shaped flange means formed on the body, said locking lug means and L-shaped flange means adapted to engage L-shaped flange means and locking lug means, respectively, of another coupling member similar to said coupling member, to couple said members together when the members are placed in abutting relationship and rotated oppositely with respect to each other; the improvement including a radially extending slot formed in the curved end portion of the tubular body; a rigid finger having an angled end and an opposite pivot end, said finger ends being planar straight sections with the angled end section forming an included angle with the pivot end section of approximately 45°; pin means for pivotally mounting the finger on the body within the slot for movement of the angled end in a generally radial direction with respect to the tubular body between locked and unlocked positions; and said angled end section being adapted to extend generally along an outer edge of the L-shaped flange means of a coupled coupling member to trap a corner of said L-shaped flange means between said angled end section and the curved end portion of the tubular body.

* * * * *